(12) United States Patent
Zabroda

(10) Patent No.: US 6,275,078 B1
(45) Date of Patent: Aug. 14, 2001

(54) SELF-ADJUSTABLE IMPENDANCE LINE DRIVER

(75) Inventor: Oleksiy Zabroda, Kanata (CA)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/497,980

(22) Filed: Feb. 4, 2000

(51) Int. Cl.⁷ ............................... H03B 1/00; H03K 3/00
(52) U.S. Cl. ........................ 327/108; 327/110; 327/65; 327/67
(58) Field of Search ..................... 327/108, 110, 327/65, 67, 54, 55, 562, 563; 326/26, 30, 82, 83; 323/315, 316; 330/260, 305

(56) References Cited

U.S. PATENT DOCUMENTS

| | | | |
|---|---|---|---|
| 4,798,982 | 1/1989 | Voorman | 333/32 |
| 5,121,080 | 6/1992 | Scott, III et al. | 330/260 |
| 5,249,225 * | 9/1993 | Williams | 379/404 |
| 5,285,744 * | 2/1994 | Leonowich | 327/110 |
| 5,459,440 | 10/1995 | Claridge et al. | 333/32 |
| 5,510,751 * | 4/1996 | Nauta | 330/260 |
| 5,585,732 | 12/1996 | Navabi et al. | 330/260 |
| 5,585,763 * | 12/1996 | Navabi et al. | 330/260 |
| 5,631,595 * | 5/1997 | Lakshmikumar | 327/110 |
| 5,644,258 * | 7/1997 | Wu | 327/110 |
| 5,757,210 * | 5/1998 | Sanzo | 327/67 |
| 5,793,223 * | 8/1998 | Frankeny | 326/30 |
| 5,796,276 * | 8/1998 | Phillips et al. | 327/108 |
| 5,936,393 | 8/1999 | Nauta | 323/316 |
| 5,973,490 | 10/1999 | Nauta | 323/316 |
| 6,107,867 * | 8/2000 | Lakshmikumar | 327/110 |

OTHER PUBLICATIONS

B. Nauta, et al., "Analog Video Line Driver with Adaptive Impedance Matching", ISSCC98, Session 20, SA 20.1, Feb. 7, 1998.

R. Mahadevan, et al., "A Differential 160MHz Self–Terminating Adaptive CMOS Line Driver", ISSCC2000, Session 26, WP 26.6, Feb. 9, 2000.

D. Johns, et al., "Integrated Circuits for Data Transmission Over Twisted Pair Channels", 1997 IEEE Journal of Solid–State Circuits, vol. 32, No. 3, Mar. 1997, pp. 398–406.

* cited by examiner

Primary Examiner—Terry D. Cunningham
Assistant Examiner—Long Nguyen
(74) Attorney, Agent, or Firm—Theodore E. Galanthay; Lisa K. Jorgenson; Andre M. Szuwalski

(57) ABSTRACT

A pair of equivalent controlled impedance buffers are connected in a push-pull configuration to a transformer primary coil. A pair of equivalent pre-drivers are connected to the pair of buffers. Each pre-driver receives a driver input signal and outputs a buffer input signal and a proportional flyback compensation signal. Each buffer receives the buffer input signal generated from one of the pre-drivers for buffered output as a line driver signal to the primary coil which induces a flyback voltage effect in each buffer. Each buffer further receives the flyback compensation signal generated from the other one of the pre-drivers, with the buffer operating to cancel the flyback voltage effect induced in that buffer using the flyback compensation signal received from the other one of the pre-drivers. An adjustment circuit further outputs an adjustment signal for application to an adjustable current source. By manipulating the adjustable current source with the adjustment signal, the output impedance of the buffer can be made to match the characteristic impedance of a transmission line connected to the transformer secondary coil.

33 Claims, 18 Drawing Sheets

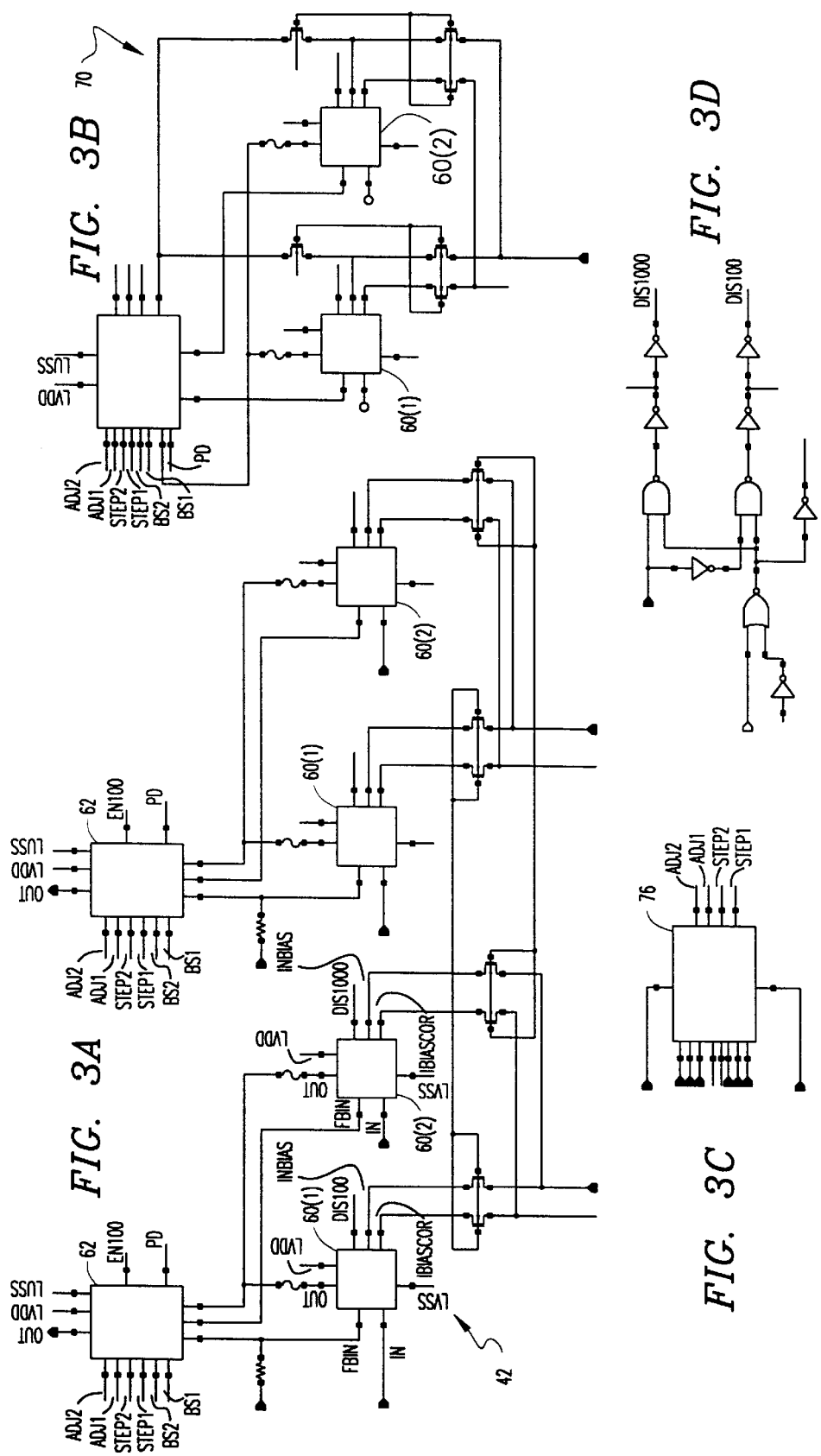

SELF-ADJUSTABLE IMPENDANCE LINE DRIVER

BACKGROUND OF THE INVENTION

1. Technical Field of the Invention

The present invention relates to a line driver having a self adjustable output impedance and, in particular, to a transformer line driver.

2. Description of Related Art

Line drivers having a controlled output impedance are well known in the art. See, B. Nauta, et al., "Analog Video Line Driver with Adaptive Impedance Matching," ISSCC98, pp. 318–19, 1998. A simplified schematic of one such driver 10 is illustrated in FIG. 1A. The driver 10 (also referred to as a "buffer") comprises an operational amplifier 12 whose negative input terminal receives an input voltage Vin. The output terminal of the operational amplifier 12 is connected to the gates of two field effect transistors 14 and 16, where the illustrated "N" value is equal to the ratio of their respective drain currents. The sources of the field effect transistors 14 and 16 are connected to a reference voltage Vdd. The drains of the field effect transistors 14 and 16 are connected to each other by a resistor (R1) 18. The drain of the field effect transistor 14 is connected in a feedback fashion to the positive input terminal of the operational amplifier 12, and is also connected to ground through a resistor (R2) 20. An output voltage Vout is supplied from the drain of the field effect transistor 16 to drive a transmission line 22 having a characteristic resistance equal to the load resistance (RL) 24. By properly selecting the values of the resistors R1 and R2 for the driver 10 in a well known manner (and as illustrated) with respect to the "N" value and the value of the load resistance RL, the value of the output impedance from the driver may be set (i.e., controlled) substantially equal to the load resistance RL. An advantage of this driver is its reduced power dissipation which makes it very attractive for implementation in an integrated circuit. However, with respect to an integrated circuit fabrication, the precise resistance values needed to achieve substantial matching of driver-line impedance are very difficult to consistently obtain.

It is recognized that it would be advantageous to be able to exercise some adjustment control over the output impedance of the driver following the setting of the resistance values. The driver of FIG. 1A may be modified, as shown in FIG. 1B, to provide for such an adjustment mechanism. Controllable source degeneration (through circuit 30) is applied to the transistors 14 and 16. The current ratio value "N" is electrically tunable (through circuit 30) via application of the voltage Vtune. In this implementation, the driver adapts to match the load resistance RL using a control loop 28 that integrates the output current of the transconductance amplifier onto the capacitor connected to Vtune for application to circuit 30 resulting in an adjustment to the source current of transistor 14 and a change in the value of N. At low frequencies, the control loop 28 forces Vout to equal Vin, in which case the gain of the driver is one. By then setting the resistances R1 and R2 as discussed above, approximate matching of the output impedance to the load resistance RL is obtained, with the control loop 28 further refining the matching.

Most telecommunications devices utilize a transformer decoupling of the driver and the transmission line. Because transformer driver-line decoupling is utilized in the push-pull configuration, a direct current output signal related to the load resistance is not available to be integrated by the control loop 28 and produce the adjustment signal Vtune. Furthermore, if the transmission line is relatively long, its direct current resistance is substantially different from the characteristic impedance. In such situations, the precision of the impedance adjustment provided by the FIG. 1B circuit is not sufficient. Additionally, the FIG. 1A prior art driver has not, historically, been well suited for use in a push-pull B-class circuit as two such drivers are needed and they do not operate well together in push-pull. When one half of the push-pull circuit (i.e., one driver 10) generates some voltage in one half of the primary coil of the transformer, a flyback voltage appears in the other half of the primary coil. This flyback voltage penetrates to the input of the operational amplifier 12 of the other driver 10 through the feedback circuit connections and corrupts driver operation.

There accordingly exists a need for a line driver having a self-adjustable output impedance with reduced power dissipation and improved power efficiency for implementation in an integrated circuit.

SUMMARY OF THE INVENTION

A line driver circuit is provided for connection to a signal transmission line. The circuit includes a controlled or synthesized impedance buffer. The line driver circuit further includes an adjustment circuit that outputs an adjustment signal for application to an adjustable controlled current source within the buffer. By manipulating the adjustable controlled current source with the adjustment signal, the output impedance of the buffer can be made to substantially match the characteristic impedance of a transmission line connected to the driver.

BRIEF DESCRIPTION OF THE DRAWINGS

A more complete understanding of the method and apparatus of the present invention may be acquired by reference to the following Detailed Description when taken in conjunction with the accompanying Drawings wherein:

FIGS. 3–16 are schematic diagrams of a possible design for the push-pull type transformer line driver with adjustable output impedance of FIG. 2 as configured for implementation in an integrated circuit.

DETAILED DESCRIPTION OF THE DRAWINGS

Figure 1A:
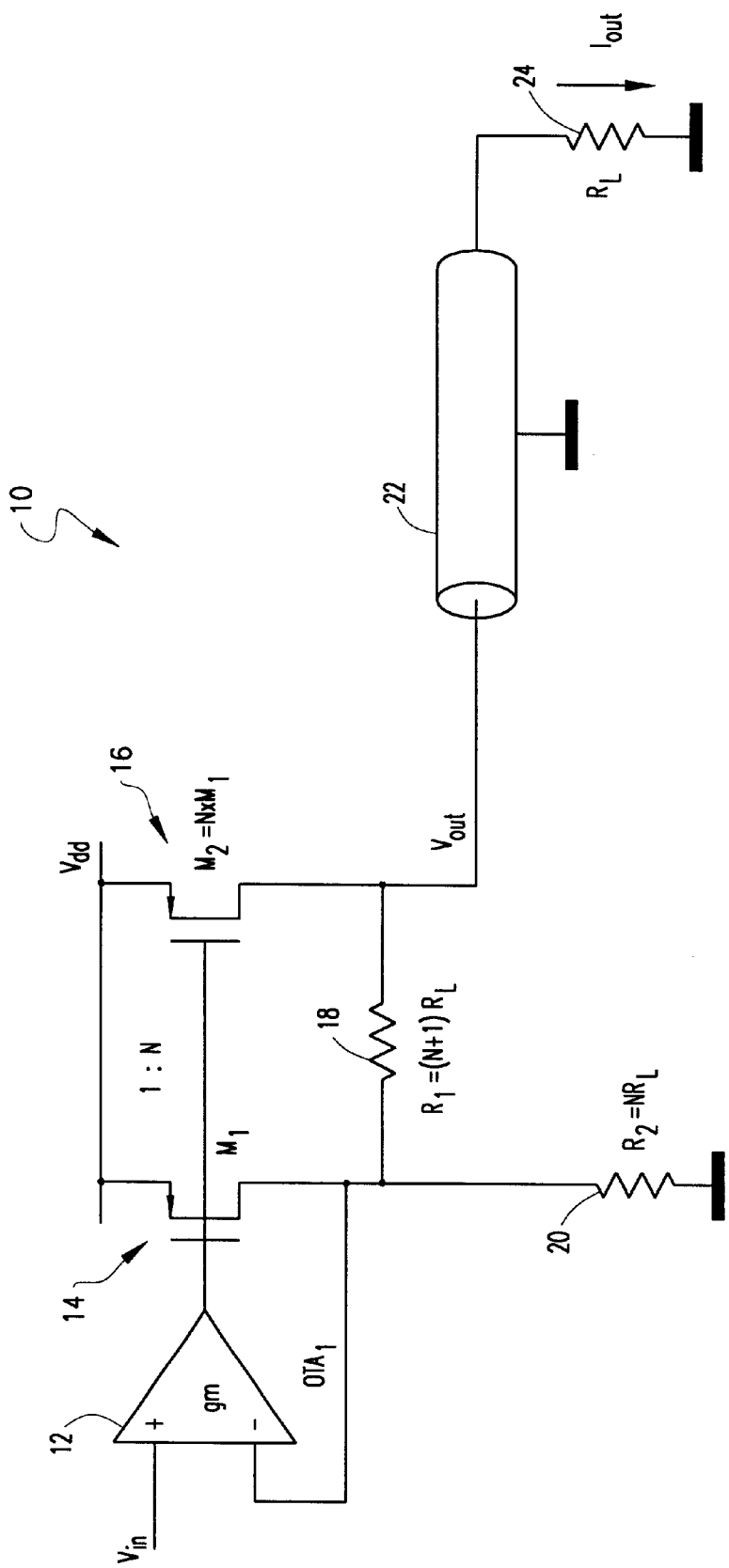
FIGS. 1A and 1B, previously described, are schematic diagrams of prior art line drivers having a controlled and tunable, respectively, output impedance.
Figure 1B:
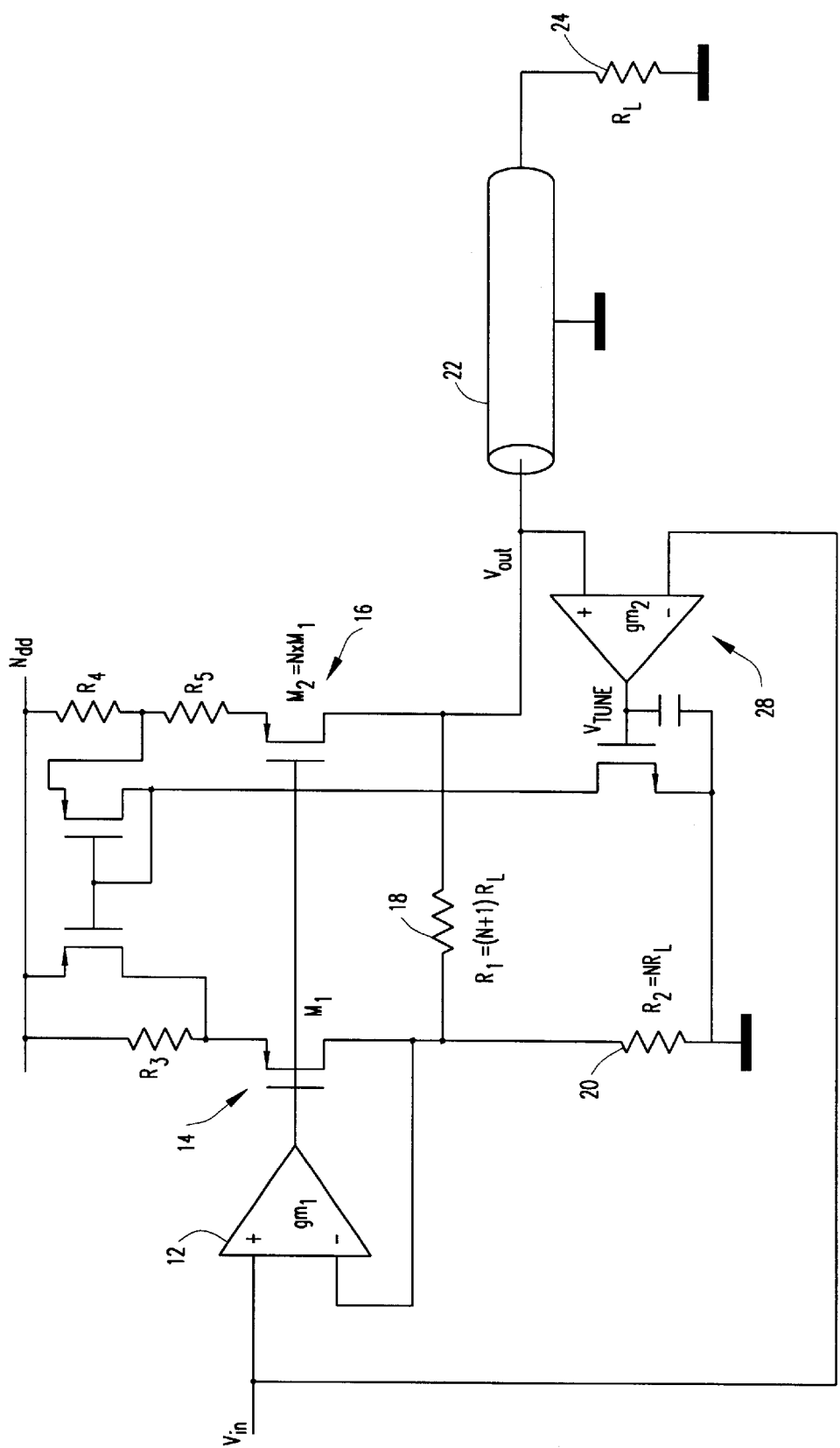
Figure 2A:
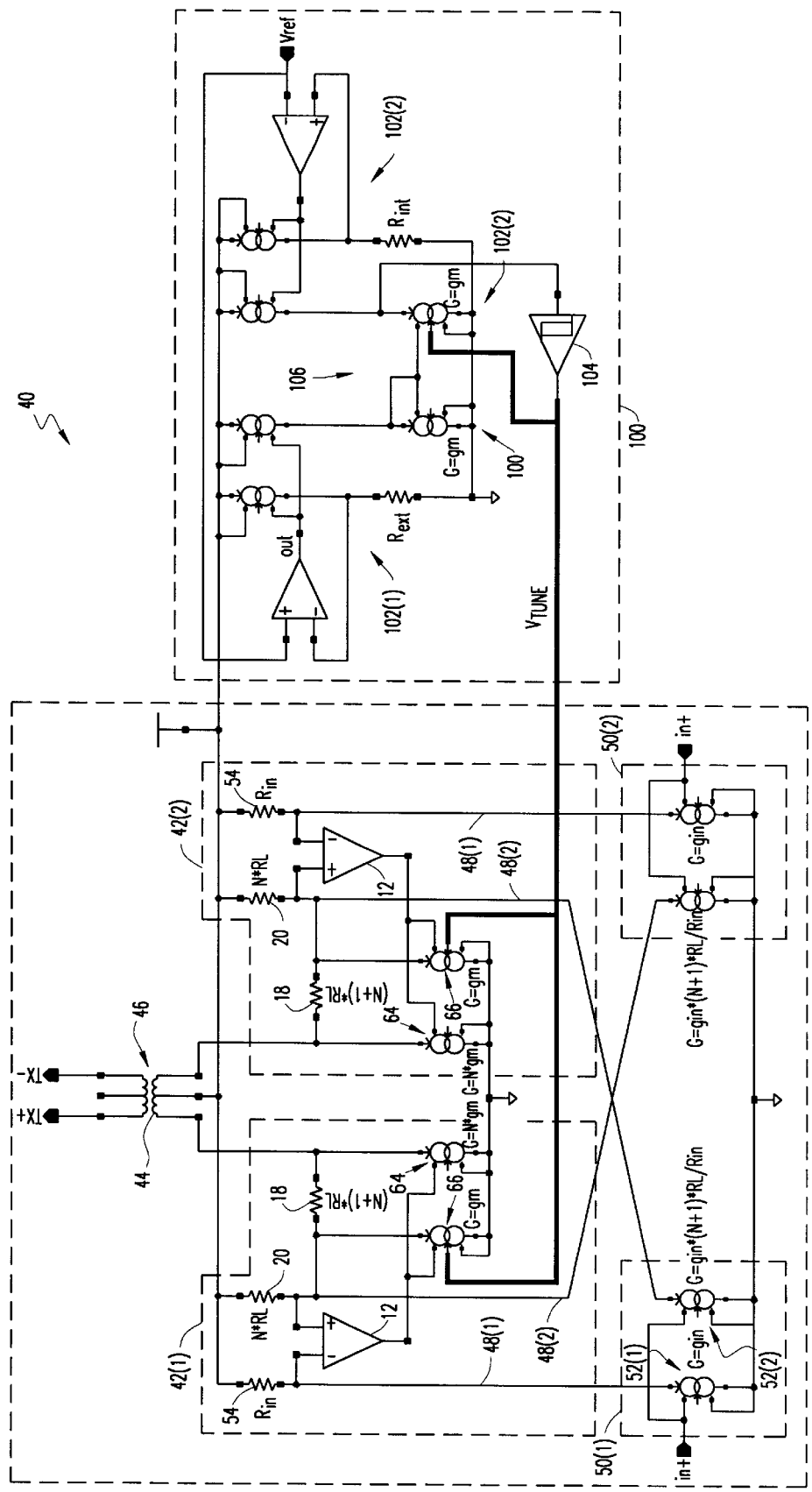
FIG. 2A is a schematic diagram of a push-pull type transformer line driver with adjustable output impedance in accordance with the present invention.

Reference is now made to FIG. 2A wherein there is shown a schematic diagram of a push-pull type transformer line driver 40 with adjustable output impedance in accordance with the present invention. The driver 40 includes a pair of identical controlled or synthesized impedance buffers 42(1) and 42(2) whose outputs are connected to the end terminals of a center tapped primary coil 44 of a transformer 46 in a configuration constituting a push-pull circuit. Each buffer 42 may comprise the illustrated buffer, a buffer/driver similar or equivalent to that shown in FIG. 1, or another buffer/driver which provides a controlled or synthesized output impedance preferably with reduced power dissipation characteristics suitable for integrated circuit fabrication. Each buffer 42 includes a pair of inputs 48(1) and 48(2). In the specific implementation illustrated these inputs are applied to the negative and positive input terminals, respectively, of the included operational amplifier 12. One input 48(1) receives a buffer input signal, while the other input 48(2) receives a flyback compensation signal (the purpose of which will be described later).

The buffer input signal applied to the first input 48(1) of each buffer 42 provides an input current that is passed through the buffer and output as a line driver signal for application to an end terminal of the center tapped primary coil 44 for the transformer 46. While outputting the line driver signal, the buffer 42 maintains the value of its output impedance for the connection to the transformer 46 in a condition set equal to the characteristic impedance RL of a transmission line (not shown) connected at TX+ and TX− terminals of the secondary coil. As was discussed above in connection with the prior art buffer/driver of FIG. 1A, this line driver signal as applied by one buffer 42 (for example, buffer 42(1)) in such a push-pull configuration to one half of the primary coil induces a flyback voltage in the other half of the primary coil that penetrates (as an unwanted flyback signal) through the other buffer (for example, buffer 42(2), which at that time is inactive) to corrupt driver 40 operation. This is especially a concern when a buffer/driver of the prior art FIG. 1A type (or similar) is used because the unwanted flyback signal may pass through the feedback loop of the buffer to the positive input terminal of the operational amplifier 12.

To address this issue, the driver 40 further includes a pair of pre-driver circuits 50(1) and 50(2). Each pre-driver circuit 50 receives an input signal (Vin in differential+/−format) and outputs two signals: a first signal comprising the buffer input signal for application to the first input 48(1) of one of the buffers 42 (for example, buffer 42(1)); and a second signal comprising the flyback compensation signal for application to the second input 48(2) of the other buffer 42 (for example, buffer 42(2)). Thus, it is recognized that the buffer input signal generated by the first pre-driver 50(1) is applied to the first input 48(1) of the first buffer 42(1), while the flyback compensation signal generated by the first pre-driver 50(1) is applied to the second input 48(2) of the second buffer 42(2). Conversely, the buffer input signal generated by the second pre-driver 50(2) is applied to the inverting input of OPAMP 12 of the second buffer 42(2) while the flyback compensation signal generated by the second pre-driver 50(2) is applied to the second input 48(2) of the first buffer 42(1). It will be understood that the pre-driver may alternatively be implemented as a differential circuit (to process the received driver input voltage signal and generate the appropriate input voltage and flyback compensation signals) instead of having two equivalent pre-drivers 50(1) and 50(2).

The flyback compensation signal as generated by the pre-driver 50 is proportional (in current) to the buffer input signal. The ratio of the currents for these signals is selected in such a way that current of the flyback voltage induced in the primary coil of the transformer by the adjacent half of the push-pull driver (as represented by the unwanted flyback signal that penetrates through the feedback to the input of the operational amplifier, and due to the applied line driver signal) is substantially equal to current of the generated flyback compensation signal. Under this condition, the operation of one buffer 42 does not affect the operation of the other included buffer as these two signals will cancel each other (through a subtraction operation) at the output of the operational amplifier 12.

The values of the resistances and transconductances for the components of each buffer 42 in a preferred embodiment are set as recited with respect to the driver/buffer 10 of FIG. 1 in order to provide a controlled output impedance matching the characteristic impedance RL of the transmission line. Each pre-driver 50 includes a pair of controlled current sources 52(1) and 52(2) that receive the driver input voltage signal and output the input voltage signal and flyback compensation signal. The output of the first current source 52(1) is connected to the negative input terminal of the operational amplifier of one buffer 42 (to provide the buffer input signal) and the output of the second current source 52(2) is connected to the positive input terminal of the operational amplifier of the other buffer (to provide the flyback compensation signal). The values of the transconductances of the first and second current sources 52(1) and 52(2), respectively, must be properly chosen such that the current of flyback voltage (i.e., the unwanted flyback signal) induced in one half of the primary coil of the transformer by the adjacent half of the push-pull driver will be substantially equal to the generated flyback compensation signal (i.e., to set the appropriate proportional relationship). Given the values of the resistances and transconductances for the components of each buffer 42 as set forth above (see, FIG. 1), the appropriate transconductances for the first and second current sources 52(1) and 52(2) are as follows:

$$G(\text{source } 52(1)) = \text{gin};$$

and $$G(\text{source } 52(2)) = \text{gin} * \text{Rin}/(N+1)\text{RL},$$

wherein gin is the transconductance of the input signal source and Rin is the resistance value for the input resistor 54 connected between the reference voltage (Vdd) and the negative input terminal of the operational amplifier 12 in each buffer 42.

Still further, each buffer 42 includes a fixed controlled current source 64 and an adjustable controlled current source 66. The adjustable controlled current source 66 receives an adjustment signal (Vtune) output from an impedance adjustment circuit 100. The signal Vtune adjusts the current being passed by the source 66, and thus (in comparison to the current of the fixed source 64) affects the value for the current ratio "N". By properly tuning the value of N, the value of the output impedance may be more narrowly focused to match that of the load resistance RL (in a manner similar to that as discussed above in connection with FIG. 1B). When impedance is set and self-adjusted in the above-recited manner, the driver 40 operates in substantially perfect impedance matching with the transmission line.

The impedance adjustment circuit 100 includes two current sources 102(1) and 102(2), a converter 104 and a current mirror 106. The current mirror 106 includes an adjustable branch 108 and a fixed branch 110. The first current source 102(1) produces a stable current that is derived from the value of a precise reference voltage Vref and a stable precise resistor Rext. The second current source 102(2) produces a current that is derived from the value of the resistor Rint. In a preferred embodiment of the line driver implemented on an integrated circuit, the resistor Rint comprises an internal resistor residing in the integrated circuit chip, and the resistor Rext comprises a specially selected resistor residing external to the integrated circuit chip and electrically connected to the pins of the chip. Advantageously, the value of the resistor Rint is subject to the same process and temperature variations as the other "internal" resistors of the line driver (such as those resistors included in the buffer 42). The first current is applied to the input (branch 110) of the current mirror 106. The second current is applied to the output (branch 108) of the current mirror 106. The converter 104 receives the voltage output from the current mirror 106 (branch 108), compares it to some predetermined upper and lower limits and outputs (as Vtune) a digital code and a residual analog signal indicative of the results of that comparison. The converter 104 generated output Vtune accordingly comprises a combined digital/analog output that is applied to the adjustable branch 108 of the current mirror 106 to keep its output signal within some predetermined limits. In this specific case, the output Vtune sets the output current from the current mirror 106 equal to the current produced by the second current source 102(2). The output Vtune is also applied, as discussed above, to the adjustable controlled current sources 66 of each buffer 42 to tune the value of N (by controlling driver gain) and thus more narrowly focus the value of the output impedance to match that of the load resistance RL.

Figure 2B:
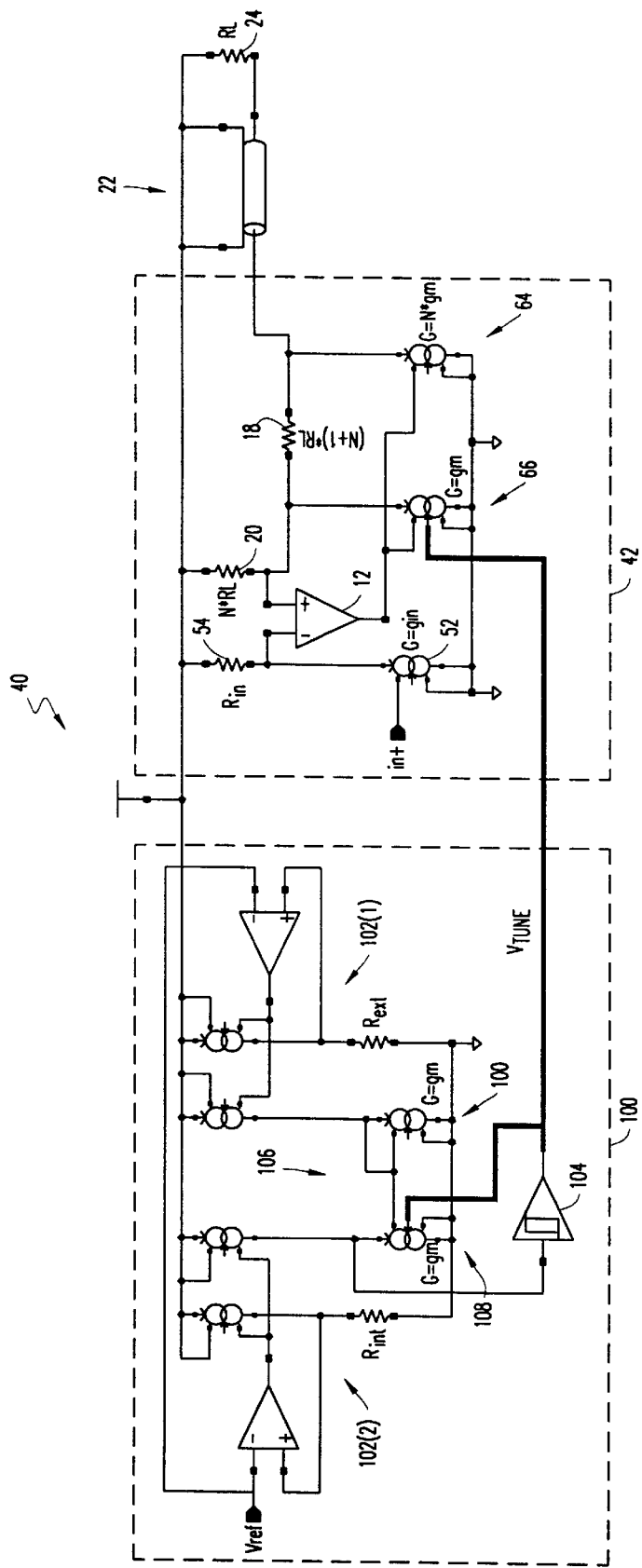
FIG. 2B is a schematic diagram of a line driver with adjustable output impedance in accordance with the present invention.

Although illustrated in the context of a push-pull implementation, it will be understood that the adjustment circuit may be utilized in conjunction with a single buffer having a controlled/controllable output impedance. It is further applicable both to a driver with transformer decoupling (as shown in FIG. 2A) and a driver with direct coupling to the line (as shown in FIG. 2B where same reference numbers designate like or similar components).

Figure 4:
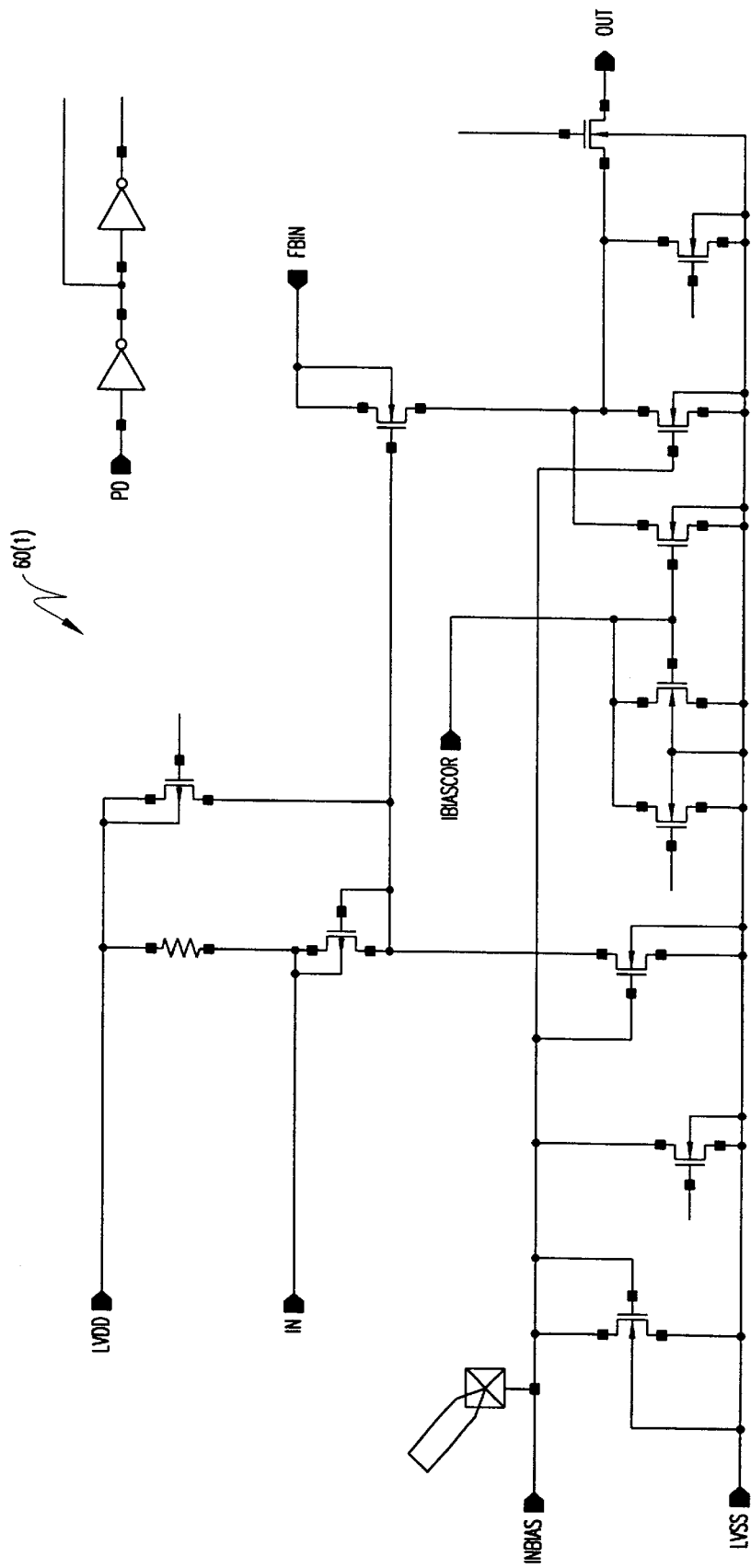
Figure 5:
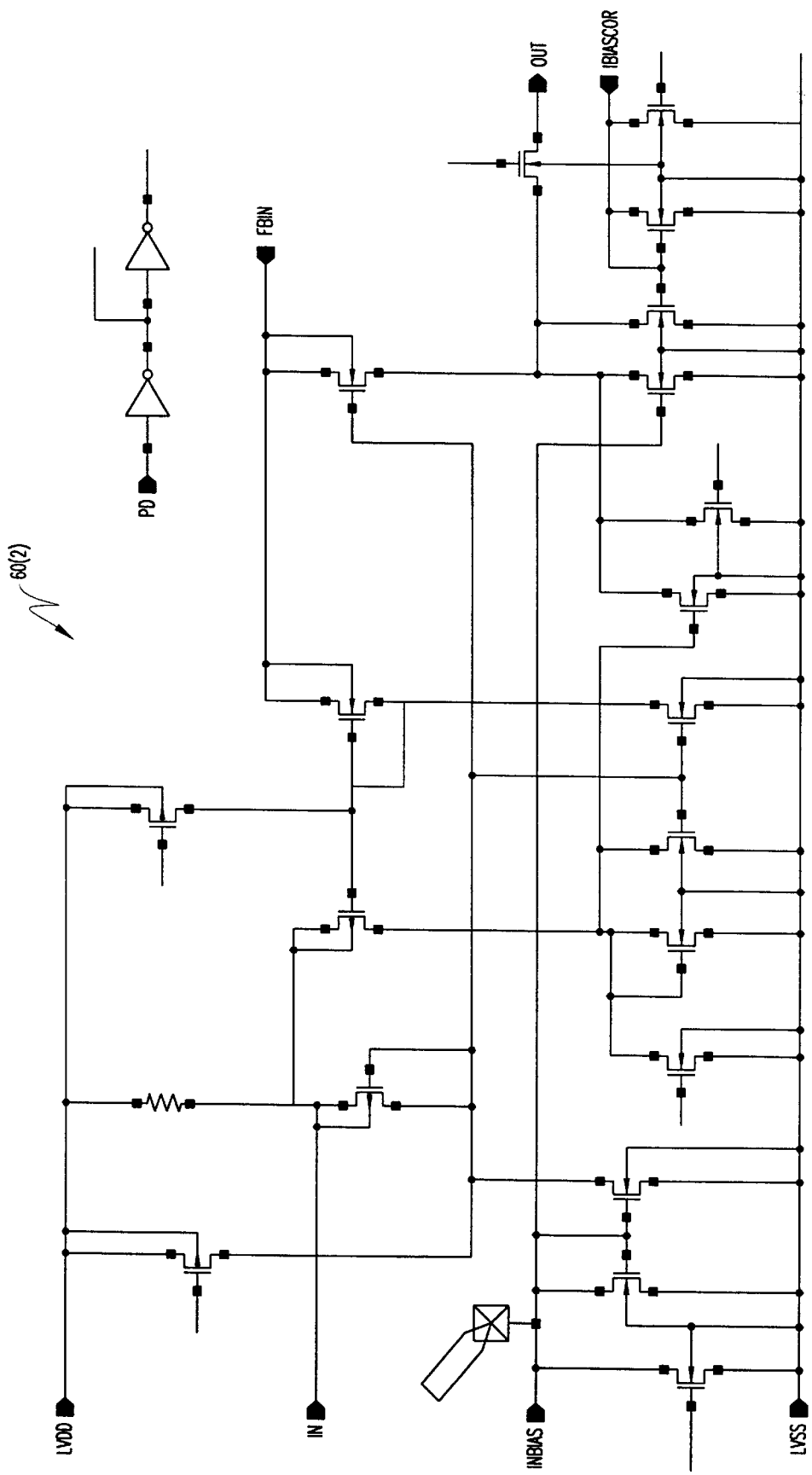
Figure 6:
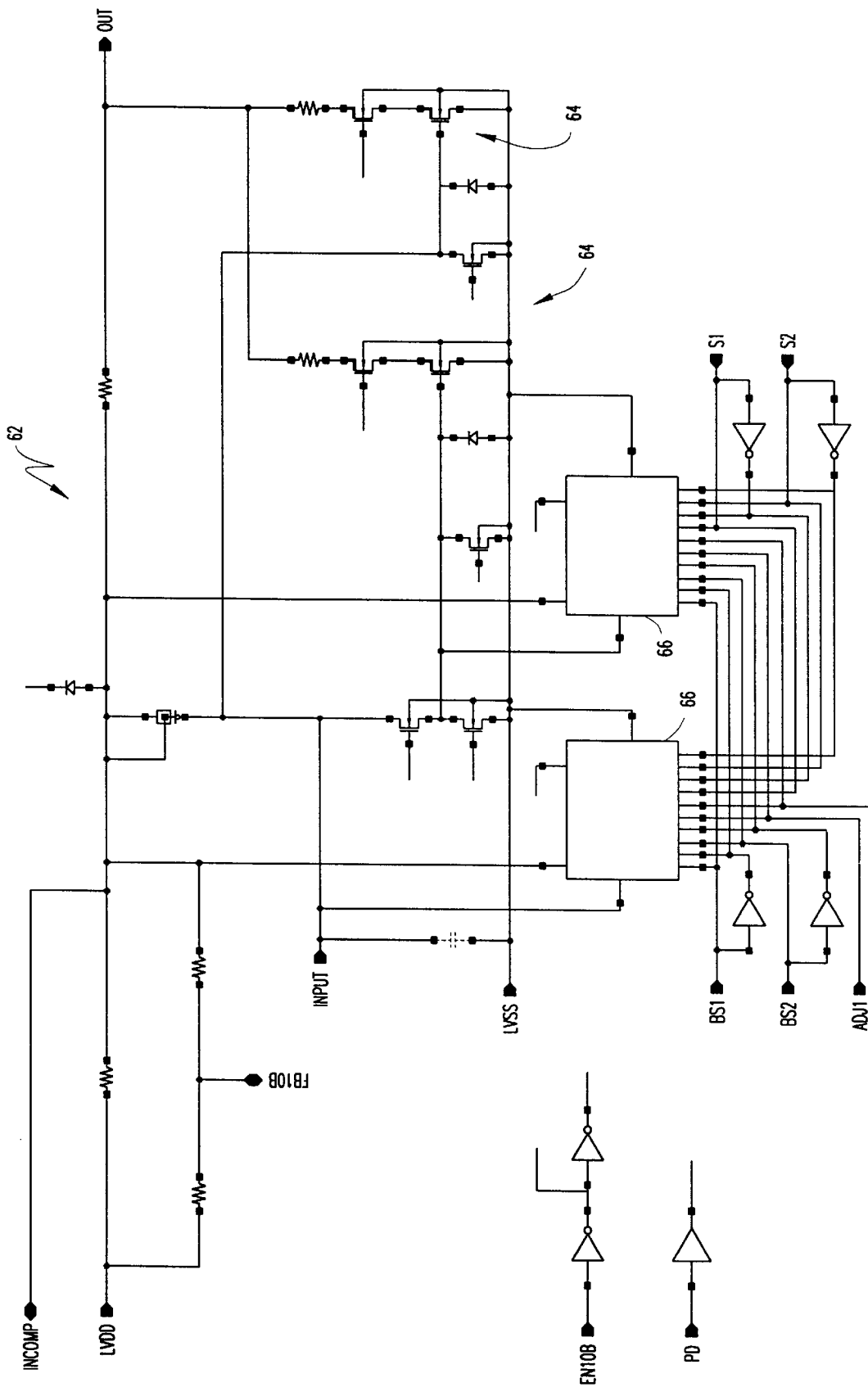
Figure 7:
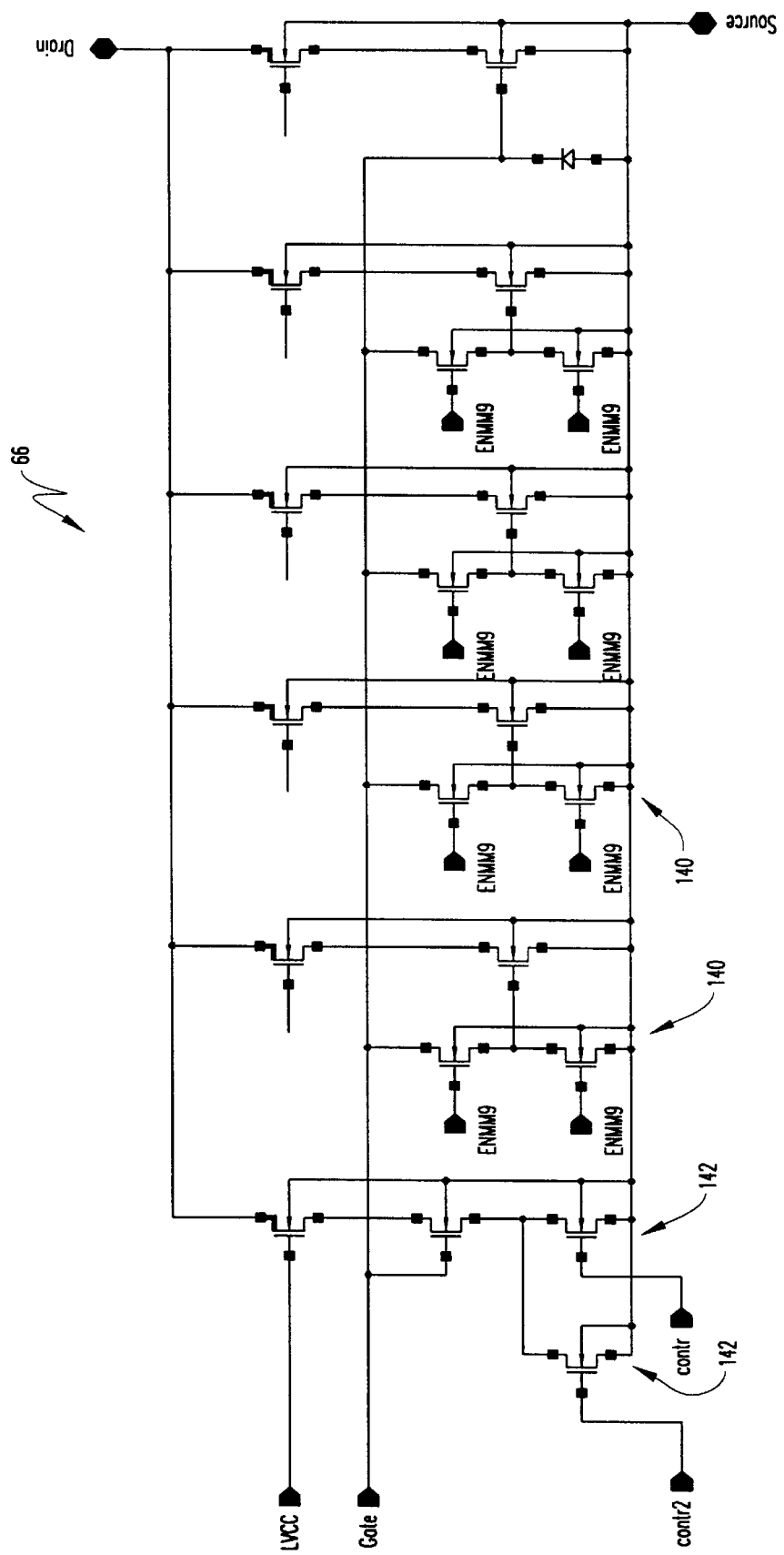
Figure 11:
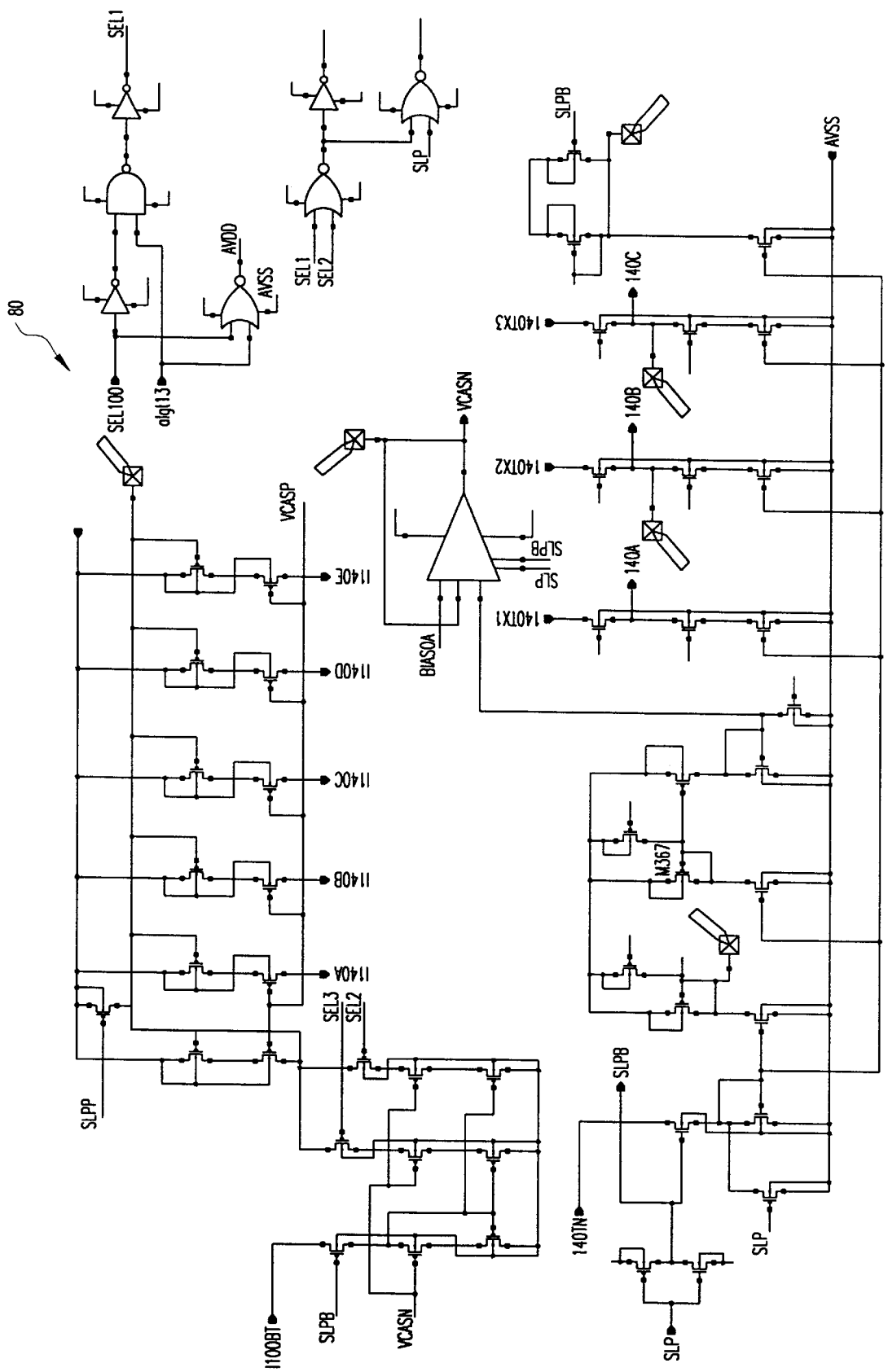
Figure 12:
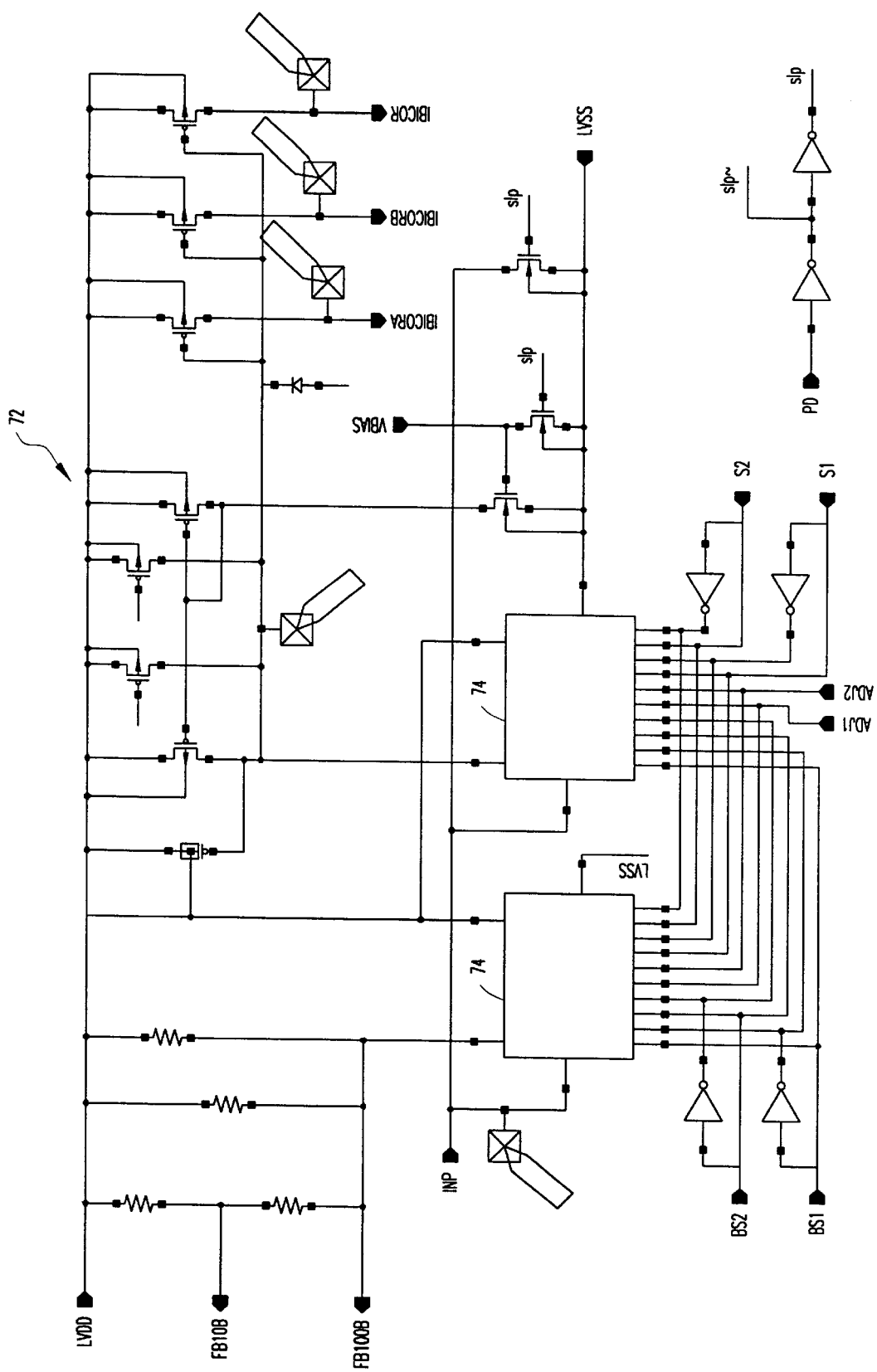
Figure 13:
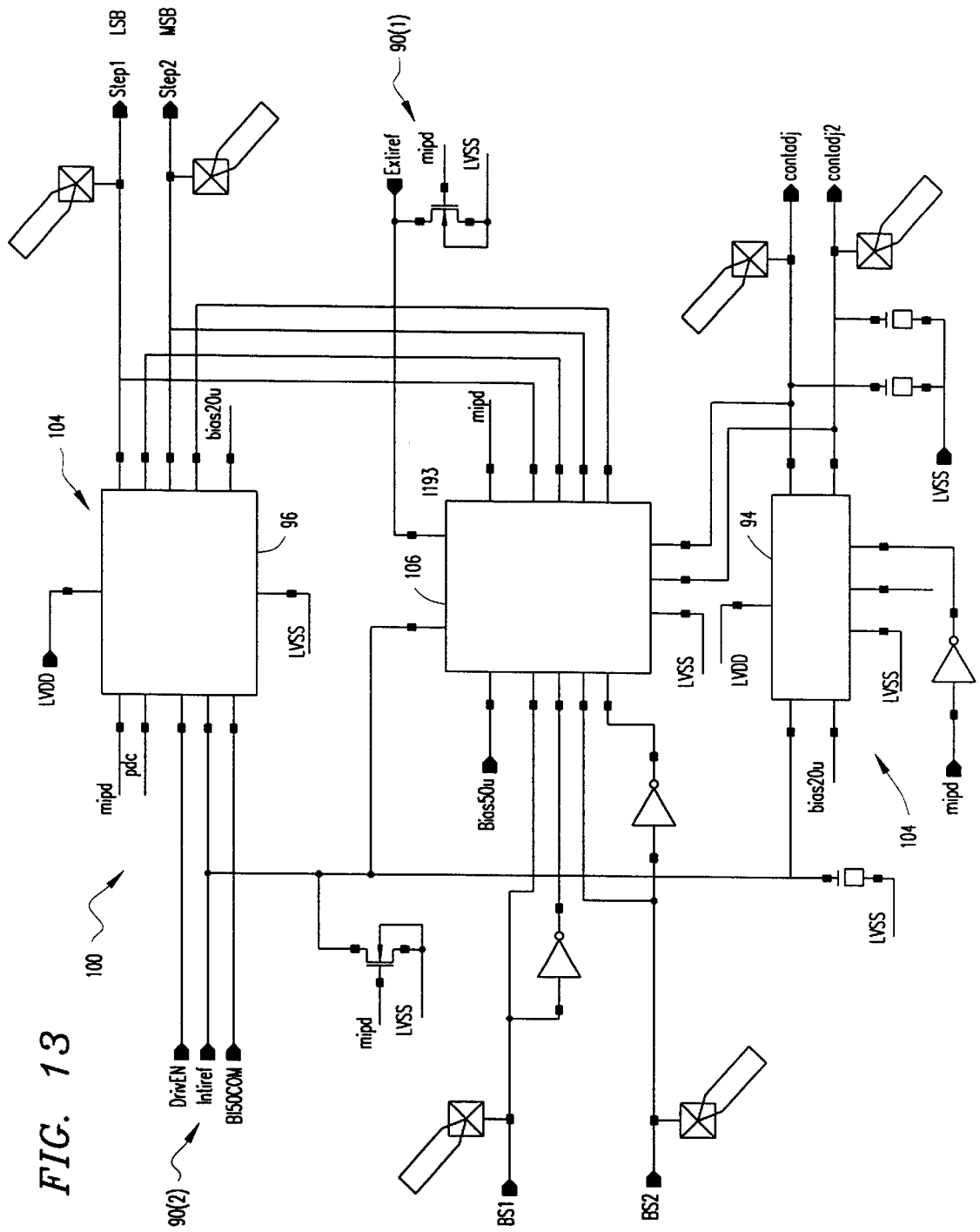
Figure 14:
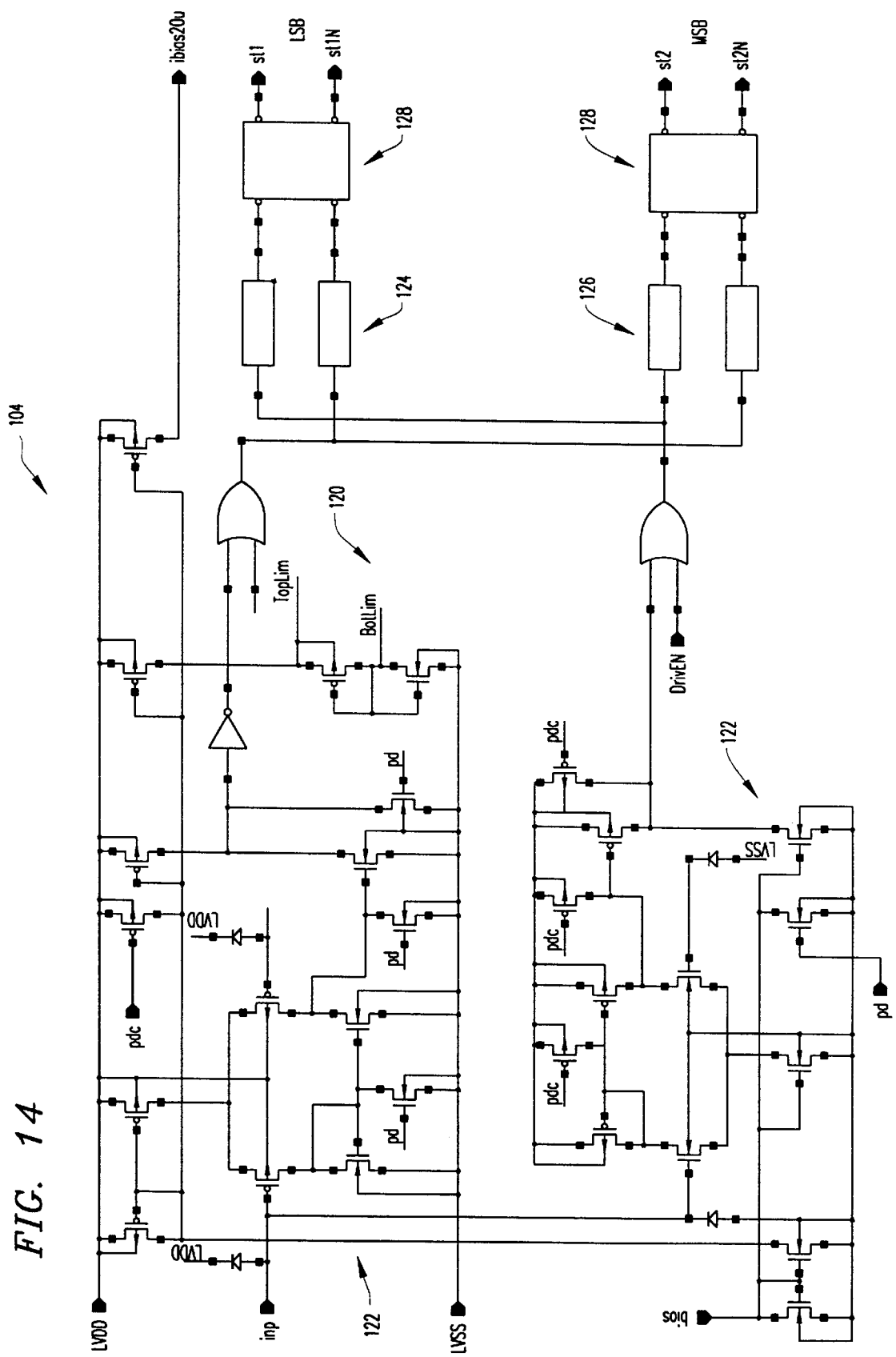
Figure 15:
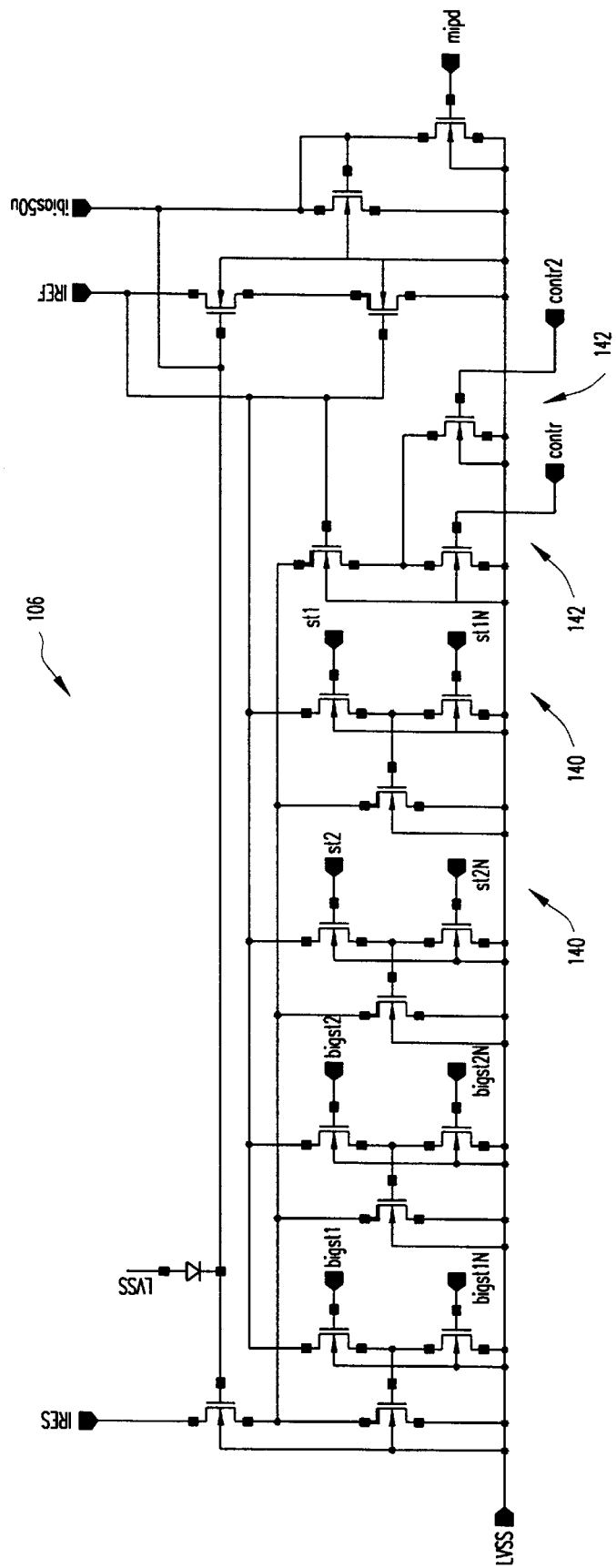
Figure 16:
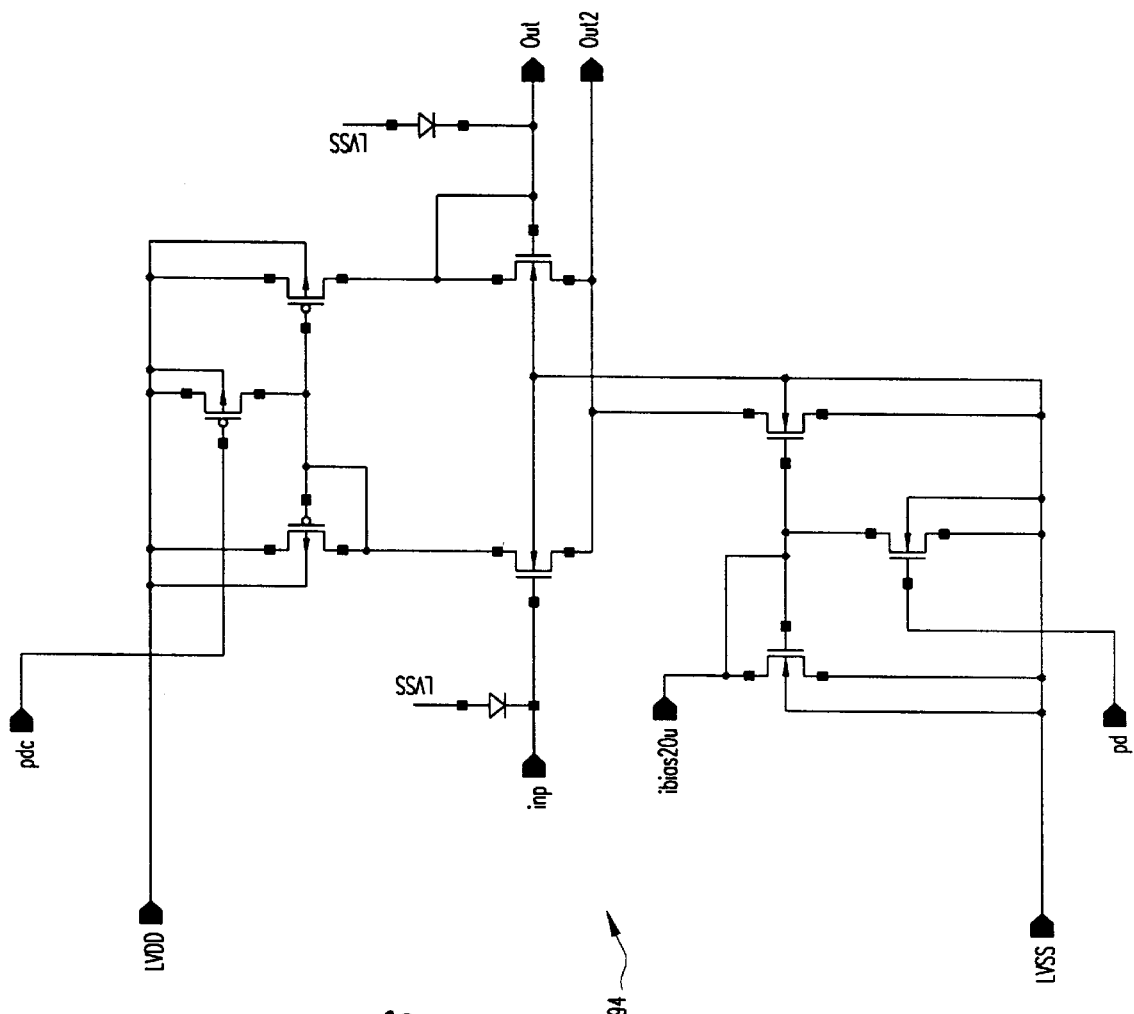

Reference is now made to FIGS. 3–16 wherein there are shown schematic diagrams of one design for the push-pull type transformer line driver 40 of FIG. 2A as configured for implementation in an integrated circuit. Turning first to FIG. 3A, there is shown a block diagram for the pair of buffers 42. The buffers 42 include a plurality of input stages 60 and a plurality of output stages 62. The input stages 60 are equivalent to the operational amplifiers 12 for the buffer 42. A more detailed schematic of the input stage 60(1) used for operation in 10BASE-T mode is shown in FIG. 4. A more detailed schematic of the input stage 60(2) used for operation in 100BASE-TX mode is shown in FIG. 5. A more detailed schematic of the output stage 62 is shown in FIG. 6. Each output stage 62 contains a pair of fixed controlled current sources 64 and a pair of adjustable controlled current sources 66. These components perform the same functions as the current sources 14 and 16 for the buffer 42. A more detailed schematic of the adjustable controlled current source 66 is shown in FIG. 7. FIG. 3B illustrates a schematic diagram for a circuit 70 to control the quiescent current of the driver. The circuit 70 includes a control circuit 72 whose more detailed schematic diagram is shown in FIG. 12, plus a pair of input stages 60(1) and 60(2) whose more detailed schematic diagrams are shown in FIGS. 4 and 5, respectively. The control circuit 72 of FIG. 12 includes a pair of adjustable controlled current sources 74 that are identical to the ones (reference 66) shown in FIG. 6. A more detailed schematic diagram of the circuit 74 is thus shown in FIG. 7. FIG. 3C illustrates a portion 76 of the adjusting circuit 100 for tuning the output impedance of the drivers 42. A more detailed schematic diagram of the circuit portion 76 is shown in FIG. 13. The circuit portion 76 includes inputs 90(1) and 90(2) for receiving the currents derived from the resistors Rext and Rint, respectively. The circuit portion 76 further includes the current mirror 106 and the converter 104 comprising an analog voltage follower 94 and a comparison circuit 96. A more detailed schematic diagram of the voltage follower 94 is provided in FIG. 16. A more detailed schematic diagram of the comparison circuit 96 is shown in FIG. 14. The comparison circuit 96 comprises a simple asynchronous two bit successive approximation A/D converter. The A/D converter contains a top and bottom limit signal generator 120, two comparators 122, two pairs of substantially different delays 124 and 126, and two RS latches 128. When the input signal of the A/D converter moves out of certain predetermined limits produced by the signal generators 120, the least significant bit (LSB) output from one latch 128 for the adjustment signal Vtune is changed first. If this change is enough to move the input signal to within the predetermined limits, then the most significant bit (MSB) output from the other latch is not changed due to the added length of the delay 126. If this LSB change, along with the analog portion of the adjustment signal Vtune output of the voltage follower 94, is not enough to move the input signal to within the predetermined limits, then the MSB output is changed. A more detailed schematic diagram of the adjustable current mirror 106 is provided in FIG. 15. The current mirror 106 includes an adjustable branch 108 having at least one current path 140 that can be turned on/off responsive to a digital control signal output from the latches 128(of the comparator 96), and at least one current path 142 controlled responsive to an analog control signal output from the voltage follower 94. Similarly, the adjustable controlled current source 66 (see, FIG. 7) includes at least one current path 140 that can be turned on/off responsive to a digital control signal output from the latches 128(of the comparator 96), and at least one current path 142 controlled responsive to an analog control signal output from the voltage follower 94 in order to control the flow of current, directly affect the value "N", and thus maintain the output impedance of the line driver in a matched condition to the transmission line. FIG. 3D illustrates the mode of operation control logic for the driver 42.

Figure 8:
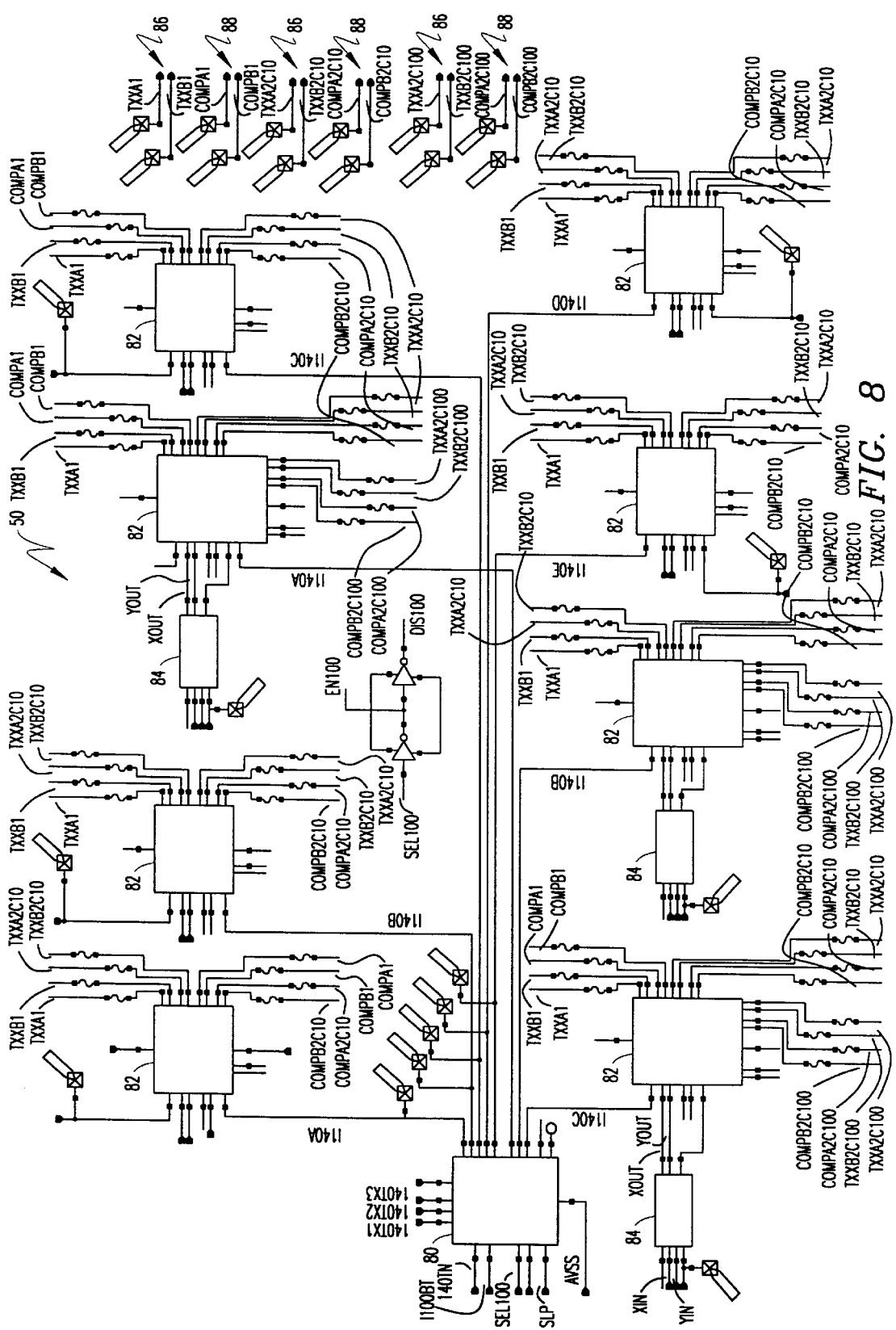
Figure 9:
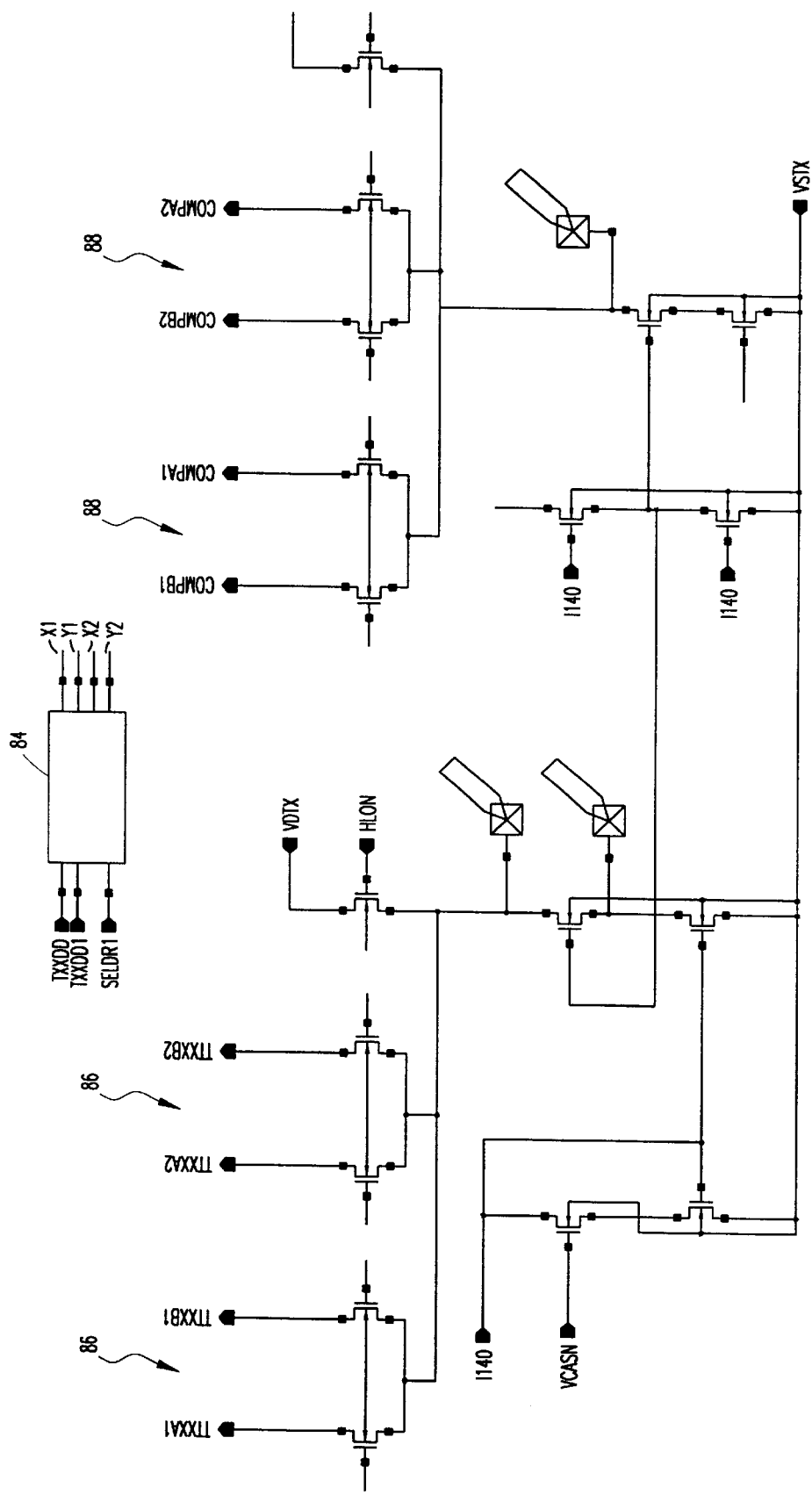
Figure 10:
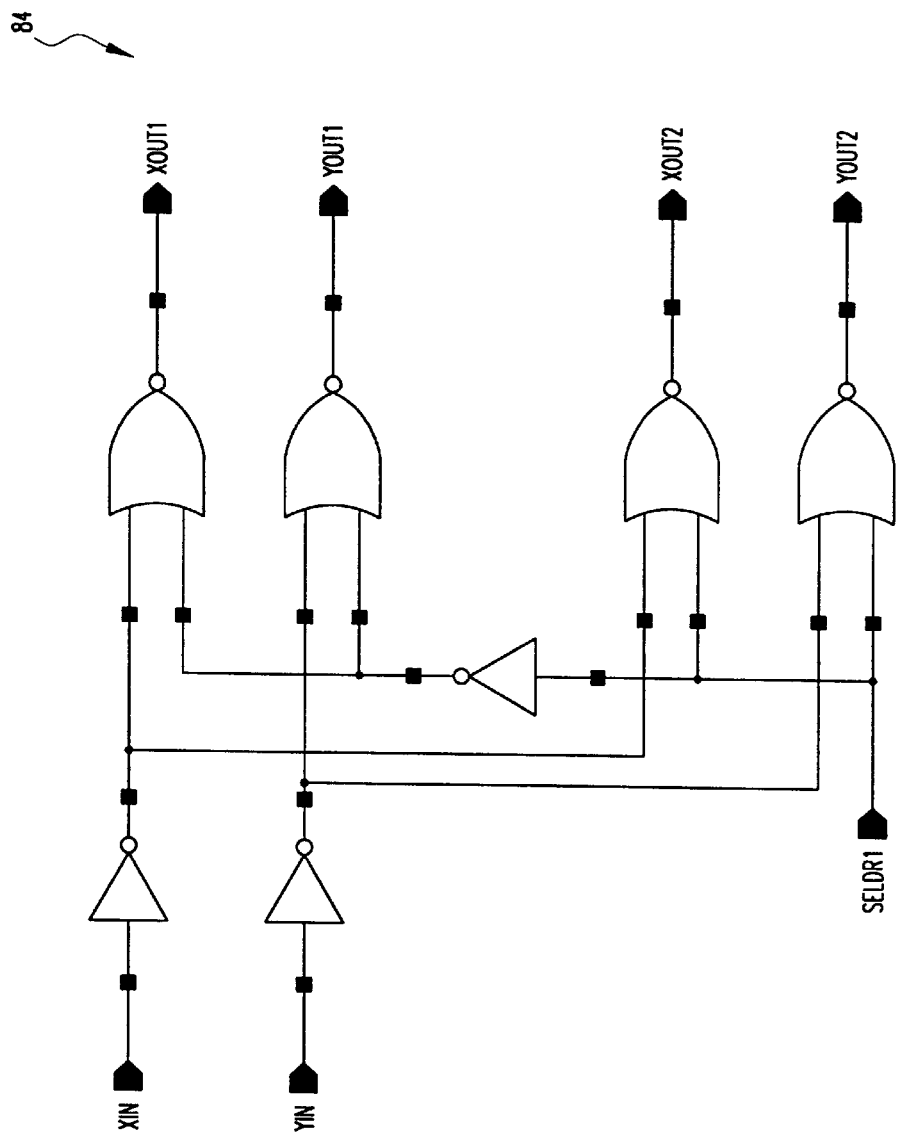

As mentioned above, the line driver 40 further includes a pair of pre-drivers 50 whose schematic block diagram is provided in FIG. 8. The pre-driver 50 comprises a current D/A converter that is used for waveshaping of the 10BASE-T and 100BASE-TX driver output signals. It includes a reference current generating block 80, a set of pre-driver D/A converter current cells 82, and a plurality of pre-driver output selecting circuits 84. A more detailed schematic diagram of the reference current generating block 80 is shown in FIG. 11. A more detailed schematic diagram of the pre-driver D/A converter current cell 82 is shown in FIG. 9, which further illustrates that outputs 86 are used as the inputs to one buffer to provide the buffer input signal, and outputs 88 are used as the inputs to the other buffer to provide the flyback compensation signal. The cell 82 produces the inputs for either buffer 42(1) or 42(2) in accordance with the commands issued by the pre-driver output selecting circuit 84 whose more detailed circuit diagram is shown in FIG. 10. FIG. 9 in particular shows that the current cell 82 is capable of simultaneously producing the buffer input signal (from output 86) for one half of the driver 40 and the flyback compensation signal (from outputs 88) for the other half of the driver 40.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A line driver circuit, comprising:
   a buffer including an adjustable current source and having a signal input and a signal output that provides a line driver output signal buffered from the signal input, the buffer further including a tuning input connected to the adjustable current source; and a tuning circuit, comprising:
- a first current source producing a first current;
- a second current source producing a second current;
- a current mirror having a fixed branch connected to receive the first current and an adjustable branch connected to receive the second current, the current mirror further having a control input connected to the adjustable branch and having an output; and
- a comparison circuit receiving the current mirror output for comparison to predetermined output voltage limits, the comparison circuit generating a control signal for application to the control input to maintain a voltage of the current mirror output within the predetermined output voltage limits and generating a tuning signal for application to the tuning input of the buffer to adjust operation of the adjustable current source to control an output impedance of the buffer.

2. The circuit of claim 1 wherein the line driver output signal is applied to a transmission line having a characteristic impedance, and wherein the tuning signal that adjusts operation of the adjustable current source controls the output impedance of the buffer to substantially match the characteristic impedance of the transmission line.

3. The circuit of claim 2 wherein the buffer is connected to the transmission line through a transformer.

4. The circuit of claim 1 wherein the tuning signal that adjusts operation of the adjustable current source controls buffer gain to provide substantially unity gain.

5. The circuit of claim 1 wherein the first current source generates the first current derived from the value of a first resistor and the second current source generates the second current derived from the value of a second resistor.

6. The circuit of claim 5 wherein the line driver circuit is fabricated on an integrated circuit and the first resistor comprises a stable precise resistor external to the integrated circuit and the second resistor comprises a resistor fabricated on the integrated circuit.

7. The circuit of claim 1 wherein the comparison circuit comprises an analog-to-digital converter that generates a digital signal representative of whether the adjustable branch output is within the predetermined limits, the digital signal applied as the control signal to the control input to maintain the current mirror output within the predetermined limits.

8. The circuit of claim 7 wherein the adjustable branch of the current mirror includes at least one current path, and the control input comprising the digital signal turns on and off that current path.

9. The circuit of claim 1 wherein the comparison circuit comprises an analog signal generator that generates a analog signal representative of the current mirror output, the analog signal applied as the control signal to the control input to the control the current mirror output.

10. The circuit of claim 9 wherein the adjustable branch of the current mirror includes at least one current path, and the control input comprising the analog signal controls current flowing through that current path.

11. A line driver circuit for connection to a transformer having a primary coil, comprising:
- a pair of equivalent buffers for connection to a first and second terminals of the primary coil, each buffer receiving a buffer input signal for buffered output as a line driver signal to the primary coil, each buffer further including an impedance circuit that sets an output impedance of the buffer, the impedance circuit having a tuning input connected to an adjustable current source whose operation controls impedance circuit setting of the buffer output impedance; and
- a tuning circuit that generates a tuning signal that is connected to the tuning input of each buffer to adjust operation of the adjustable current source to set the buffer output impedance to substantially match a characteristic impedance of a transmission line connected to the transformer.

12. The circuit of claim 11 wherein the tuning signal that adjusts operation of the adjustable current source controls each buffer gain to provide substantially unity gain.

13. The circuit of claim 11 wherein the tuning circuit comprises:
- a first current source producing a first current;
- a second current source producing a second current;
- a current mirror having a fixed branch connected to receive the first current and an adjustable branch connected to receive the second current, the current mirror further having a control input to the adjustable branch and having an output; and
- a comparison circuit receiving the current mirror output for comparison to predetermined output voltage limits, the comparison circuit generating a control signal for application to the control input of the adjustable branch to maintain a voltage of the control mirror output within the predetermined output voltage limits and generating the tuning signal for application to the tuning input of the buffer to adjust operation of the adjustable current source to control the output impedance of the buffer.

14. The circuit of claim 13 wherein the first current source generates the first current derived from the value of a first resistor and the second current source generates the second current derived from the value of a second resistor.

15. The circuit of claim 14 wherein the line driver circuit is fabricated on an integrated circuit and the first resistor comprises a stable precise resistor external to the integrated circuit and the second resistor comprises a resistor fabricated on the integrated circuit.

16. The circuit of claim 13 wherein the comparison circuit comprises an analog-to-digital converter that generates a digital signal representative of whether the adjustable branch output is within the predetermined limits, the digital signal applied as the control signal to the control input to maintain the current mirror output within the predetermined limits.

17. The circuit of claim 16 wherein the adjustable branch of the current mirror includes at least one current path, and the control input comprising the digital signal turns on and off that current path.

18. The circuit of claim 13 wherein the comparison circuit comprises an analog signal generator that generates a analog signal representative of the current mirror output, the analog signal applied as the control signal to the control input to the control the current mirror output.

19. The circuit of claim 18 wherein the adjustable branch of the current mirror includes at least one current path, and the control input comprising the analog signal controls current flowing through that current path.

20. A method for controlling the output impedance of a line driver, comprising the steps of:
- generating a first and second currents;
- applying the first current to a fixed branch of a current mirror circuit;
- applying the second current to an adjustable branch of the current mirror circuit;

comparing a voltage of an output from the current mirror circuit to some predetermined output voltage limits to generate a control signal;

applying the control signal to the adjustable branch of the current mirror circuit to maintain the current mirror voltage output within the predetermined output voltage limits;

applying the same control signal to an adjustable current source within the line driver to maintain an output impedance of the line driver in a substantially matching condition to a driven transmission line.

21. The method as in claim 20 wherein the step of generating comprises the steps of:

deriving the first current from the value of a first resistor; and deriving the second current from the value of a second resistor.

22. The method as in claim 21 wherein the line driver comprises an integrated circuit line driver, the first resistor comprises a stable precise resistor external to the integrated circuit, and the second resistor comprises a resistor fabricated on the integrated circuit.

23. The method as in claim 20 wherein the control signal comprises a digital signal, and the step of applying the control signal to the adjustable branch of the current mirror circuit comprises the step of turning a current path of the adjustable branch on and off.

24. The method as in claim 20 wherein the control signal comprises an analog signal, and the step of applying the control signal to the adjustable branch of the current mirror circuit comprises the step of adjusting the flow of current through a current path of the adjustable branch in response to the analog signal.

25. A line driver circuit for connection to a transformer having a primary coil, comprising:

a pair of equivalent controlled impedance buffers for connection a first and second terminals of the primary coil, each buffer receiving a buffer input signal for buffered output as a line driver signal to the primary coil, each buffer further including a tuning input connected to an adjustable current source whose operation effectuates control over buffer output impedance; and a tuning circuit that generates a tuning signal that is connected to the tuning input of each buffer to adjust operation of the adjustable current source to control the buffer output impedance, wherein the tuning circuit comprises:

a first current source producing a first current;

a second current source producing a second current;

a current mirror having a fixed branch connected to receive the first current and an adjustable branch connected to receive the second current, the current mirror further having a control input to the adjustable branch and having an output; and a comparison circuit receiving the current mirror output for comparison to predetermined output voltage limits, the comparison circuit generating a control signal for application to the control input of the adjustable branch to maintain the control mirror output within the predetermined output voltage limits and generating the tuning signal for application to the tuning input of the buffer to adjust operation of the adjustable current source to control the output impedance of the buffer.

26. The circuit of claim 25 wherein the line driver signal is applied through the transformer to a transmission line having a characteristic impedance, and wherein the tuning signal that adjusts operation of the adjustable current source controls the output impedance of the buffer to substantially match the characteristic impedance of the transmission line.

27. The circuit of claim 26 wherein the tuning signal that adjusts operation of the adjustable current source controls each buffer gain to provide substantially unity gain.

28. The circuit of claim 26 wherein the first current source generates the first current derived from the value of a first resistor and the second current source generates the second current derived from the value of a second resistor.

29. The circuit of claim 28 wherein the line driver circuit is fabricated on an integrated circuit and the first resistor comprises a stable precise resistor external to the integrated circuit and the second resistor comprises a resistor fabricated on the integrated circuit.

30. The circuit of claim 25 wherein the comparison circuit comprises an analog-to-digital converter that generates a digital signal representative of whether the adjustable branch output is within the predetermined limits, the digital signal applied as the control signal to the control input to maintain the current mirror output within the predetermined limits.

31. The circuit of claim 30 wherein the adjustable branch of the current mirror includes at least one current path, and the control input comprising the digital signal turns on and off that current path.

32. The circuit of claim 25 wherein the comparison circuit comprises an analog signal generator that generates a analog signal representative of the current mirror output, the analog signal applied as the control signal to the control input to the control the current mirror output.

33. The circuit of claim 32 wherein the adjustable branch of the current mirror includes at least one current path, and the control input comprising the analog signal controls current flowing through that current path.

* * * * *

UNITED STATES PATENT AND TRADEMARK OFFICE
CERTIFICATE OF CORRECTION

PATENT NO.   : 6,275,078 B1  
DATED        : August 14, 2001  
INVENTOR(S)  : Zabroda et al.

It is certified that error appears in the above-identified patent and that said Letters Patent is hereby corrected as shown below:

Title page,
Item [54], Title, replace "SELF ADJUSTABLE IMPENDANCE LINE DRIVER" with -- SELF ADJUSTABLE IMPEDANCE LINE DRIVER --

Signed and Sealed this

Eighteenth Day of March, 2003

JAMES E. ROGAN
*Director of the United States Patent and Trademark Office*